United States Patent
Britt et al.

(10) Patent No.: US 6,647,267 B1
(45) Date of Patent: Nov. 11, 2003

(54) CELLULAR TRANSMITTER FOR AUTOMATICALLY PROVIDING POSITION LOCATION AND EMERGENCY DATA

(75) Inventors: Beverly Rimmer Britt, Brick, NJ (US); John Edward Etchells, Lebanon, NJ (US)

(73) Assignee: AT&T Corp., New York, NY (US)

( * ) Notice: Subject to any disclaimer, the term of this patent is extended or adjusted under 35 U.S.C. 154(b) by 853 days.

(21) Appl. No.: 08/910,315

(22) Filed: Aug. 13, 1997

(51) Int. Cl.$^7$ .................................................. H04Q 7/20
(52) U.S. Cl. ...................... 455/456; 455/95; 455/550
(58) Field of Search ............................... 455/404, 13.2, 455/12.1, 507, 917, 521, 95, 33.1, 456, 406, 457, 550; 342/357.1

(56) References Cited

U.S. PATENT DOCUMENTS

| | | | |
|---|---|---|---|
| 5,303,297 A | * 4/1994 | Hillis | 455/456 |
| 5,334,974 A | * 8/1994 | Simms et al. | 455/457 |
| 5,396,540 A | 3/1995 | Gooch | |
| 5,479,482 A | 12/1995 | Grimes | |
| 5,497,149 A | 3/1996 | Fast | |
| 5,625,668 A | 4/1997 | Loomis et al. | 379/58 |
| 5,630,206 A | 5/1997 | Urban et al. | 455/54.1 |
| 5,630,209 A | * 5/1997 | Wizgall et al. | 455/66 |
| 5,678,194 A | 10/1997 | Grube et al. | |
| 5,727,057 A | 3/1998 | Emery et al. | |
| 5,797,091 A | * 8/1998 | Clise et al. | 455/404 |
| 5,850,599 A | * 12/1998 | Seiderman | 455/404 |
| 5,852,775 A | * 12/1998 | Hidary | 455/404 |
| 5,873,040 A | 2/1999 | Dunn et al. | |

FOREIGN PATENT DOCUMENTS

| | | |
|---|---|---|
| EP | 0735380A1 A | 2/1996 |
| WO | WO98/10538 | 3/1998 |

OTHER PUBLICATIONS

Murray, et al. "Location Tracking System with Hand–off Capabilities", *Motorola Technical Developments*, Schaumburg, Illinois vol. 27, pp. 168–173 (1996) XP000594601.
"An Answer To Remote Calls For Help," The Star–Ledger Newspaper, Monday, Sep. 13, 1999, p. 62.

* cited by examiner

*Primary Examiner*—Lester G. Kincaid

(57) ABSTRACT

A transmitter is provided for communicating over a cellular system. The transmitter includes a data storage device electronically storing predefined information to be communicated to a receiving station over the cellular system. The predefined information may include one or more telephone numbers to be contacted in an emergency, medical information, or any other type of information. A position finding receiver such as a global position system, for example, is provided for determining the current geographic location of the transmitter. The transmitter also includes a signal processing element for providing a signal that includes the predefined information and the current location. A transmission element receives the signal from the signal processing element and, in response thereto, transmits a cellular signal that includes both the predefined information and the current location. A manually operable actuator is included to establish communication with a receiving party over the cellular system and to initiate transmission of the cellular signal thereto.

8 Claims, 2 Drawing Sheets

US 6,647,267 B1

Figure 1:
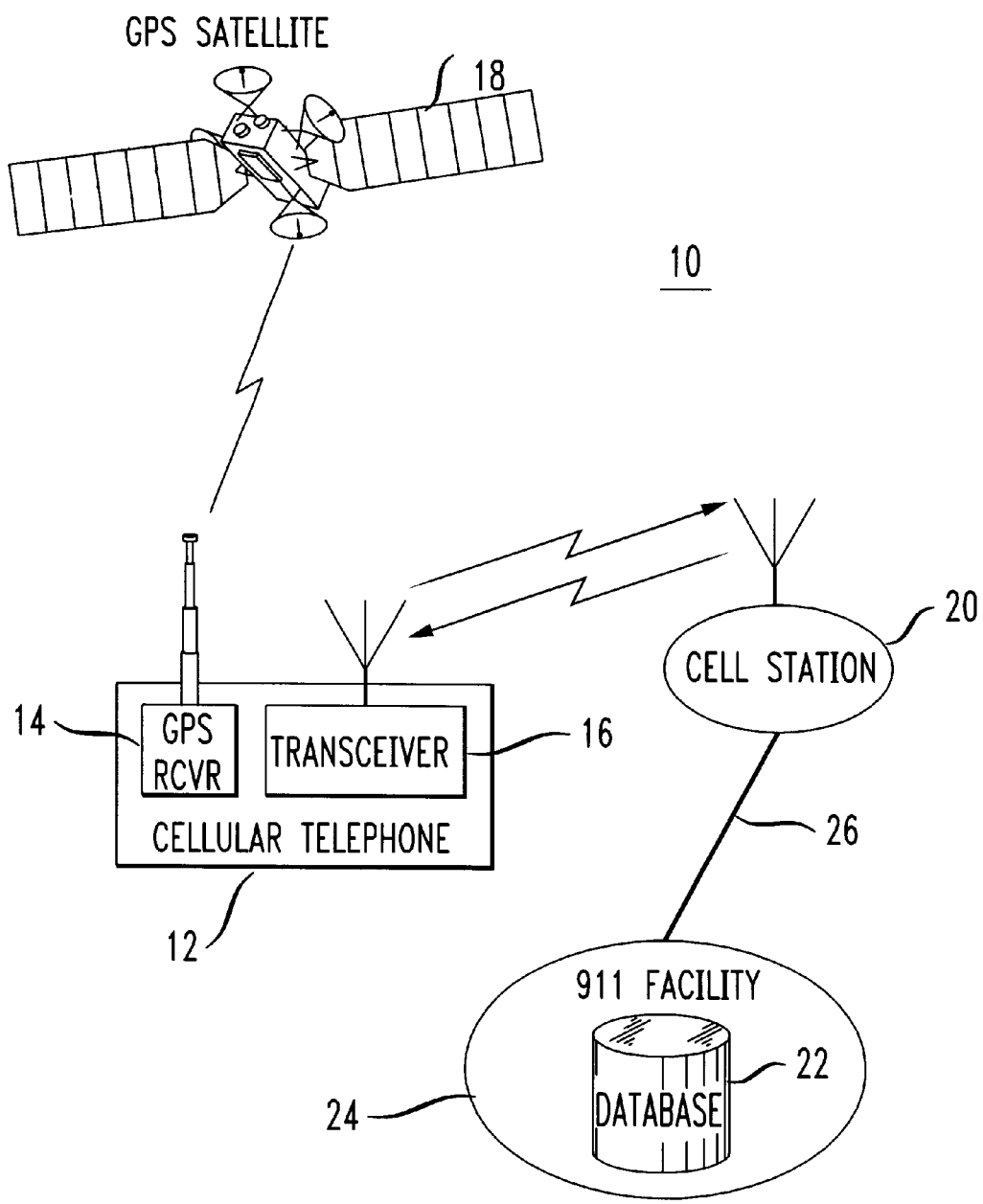

CELLULAR TRANSMITTER FOR AUTOMATICALLY PROVIDING POSITION LOCATION AND EMERGENCY DATA

BACKGROUND OF THE INVENTION

Cellular telephones are inherently mobile devices. Accordingly, a cellular telephone user-or a user's caller may not know the current location of the cellular telephone. For this reason the automatic reporting of a user's cellular telephone location is often important. For example, the user simply may not know his or her current location. Alternatively, an emergency situation may arise in which the user cannot provide verbal information due to injury or other impairment. Moreover, the ability to automatically report location information over a cellular phone may be particularly useful if the user is a child.

A cellular telephone equipped with a position finding device is disclosed in U.S. Pat. No. 5,630,209, for example. Such phones make it possible for people to gain access to a variety of services such as emergency roadside assistance (ERA), personal emergency response (PER) service, vehicle tracking assistance (VTA), traveler information assistance (TIA), traffic incident management (TIM), and fleet management services, as well as a number of other services. The position information is derived from global position system (GPS) satellites, commercial RF broadcasts such as AM and FM radio and television broadcasts or combinations thereof.

In some circumstances, automatically transmitting only location information is not sufficient to adequately address the emergency situation. It would therefore be desirable to transmit therewith additional information pertaining to the cellular phone user such as the phone number of a party to be contacted in an emergency. For example, if the user were a child it would be desirable to transmit to a "911" facility the child's home phone number or another number at which a parent can be reached if an emergency were to arise.

SUMMARY OF THE INVENTION

In accordance with the present invention, a transmitter is provided for communicating over a cellular system. The transmitter includes a data storage device electronically storing predefined information to be communicated to a receiving station over the cellular system. The redefined information may include one or more telephone numbers to be contacted in an emergency, medical information, or any other type of information. A position finding receiver such as a global position system, for example, is provided for determining the current geographic location of the transmitter. The transmitter also includes a signal processing element for providing a signal that includes the predefined information and the current location. A transmission element receives the signal from the signal processing element and, in response thereto, transmits a cellular signal that includes both the predefined information and the current location. A manually operable actuator is included to establish communication with a receiving party over the cellular system and to initiate transmission of the cellular signal thereto.

In one embodiment of the invention, the transmitter is configured as a compact device that is only operable to transmit a message to a single predefined telephone number such as a "911" facility, for example. Because of its compact size and limited dialing ability, this embodiment may be of particular use to parents who want their child to be able to contact an appropriate party should an emergency arise.

DETAILED DESCRIPTION

FIG. 1 illustrates an embodiment of a cellular telephone locating system 10 employed in the present invention. System 10 comprises a cellular telephone 12, which includes a global positioning system (GPS) navigation receiver 14 and a cellular telephone service radio transceiver 16. A plurality of orbiting GPS satellites, represented by a GPS satellite 18, transmit pseudorange information on microwave radio carriers and have determinable orbits such that the earth location of cellular telephone 12 can be ascertained by triangulation of these pseudoranges. GPS receiver 14 provides latitude, longitude and bearing information in modem tone format to cellular transceiver 16. Preferably, such information is automatically transmitted by cellular transceiver 16 shortly after processing off-hook call routing data. GPS satellite and receiver systems are well known and thus will not be discussed in greater detail.

A conventional land-fixed cellular station 20 provides two-way full duplex telephonic communication over radio channels assigned for that purpose. The cellular station 20 relays the location information received from the cellular telephone 12 to a receiving station 24 such as a "911" facility, for example. As is well known, a "911" facility 24 provides centralized emergency dispatching for telephone subscribers. A landline 26 carries the information between the cellular station 20 and the receiving. station 24.

In one particular embodiment of the invention the receiving station 20 includes a database processing facility 22. The database processing facility 22 receives the latitude, longitude and bearing information provided by cellular phone 12 and uses that data to index a plurality of databases, e.g., street, landmark, road services, intersection, zone and jurisdiction databases. The database processing facility 22 provides either spoken or digital information about the location of cellular telephone 12 in terms that are meaningful to an operator or dispatcher located at the receiving station 20. For example, latitude and longitude data provided by cellular phone 12 may be converted by database processing facility 22 to a street address. A speech synthesizer may be included in database processing facility 22 in the event such information needs to be spoken. Additional details concerning database processing facility 22 may be found, for example, in U.S. Pat. No. 5,625,668.

Figure 2:
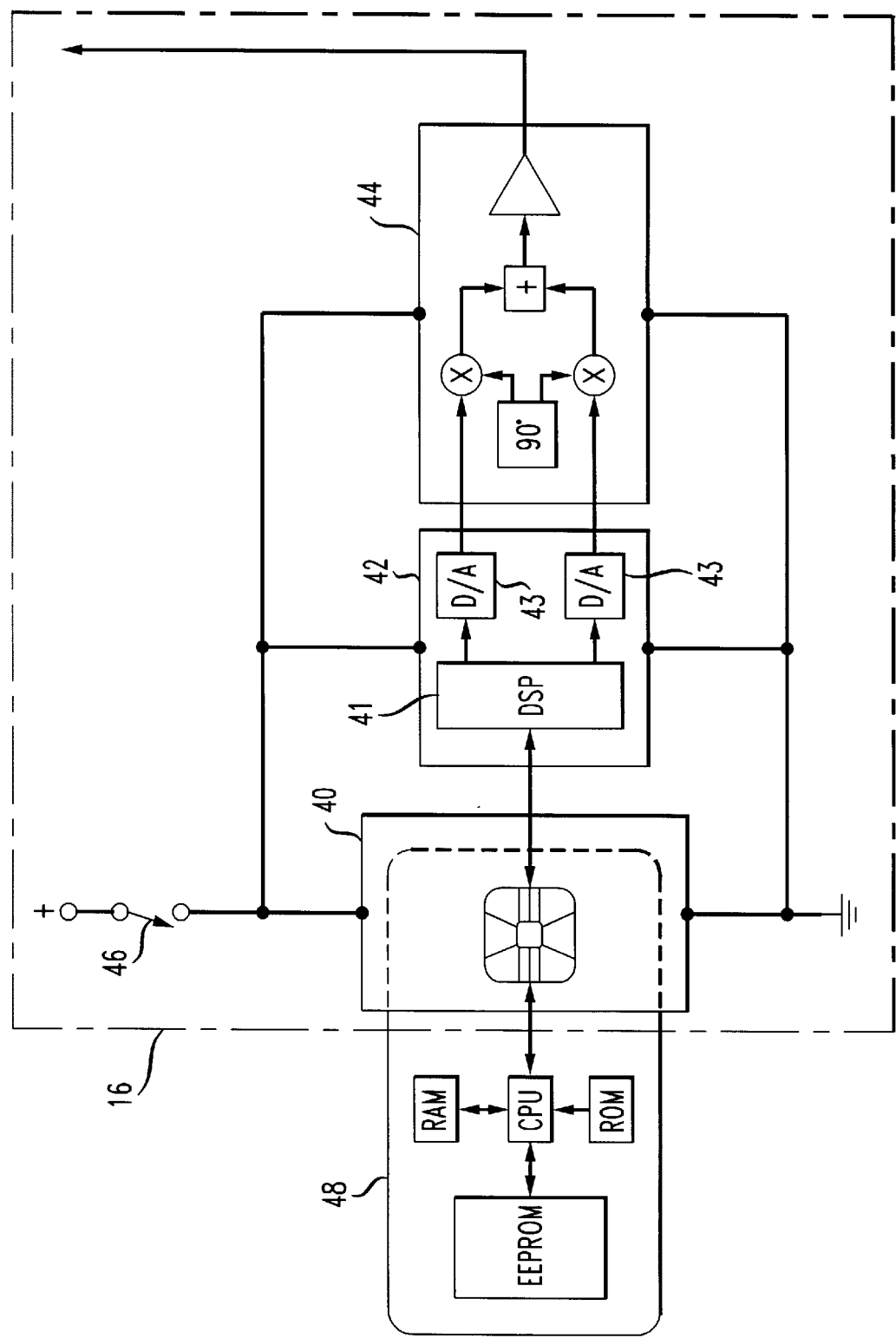

FIG. 2 shows an embodiment of the cellular transceiver 16 constructed in accordance with the present invention. Cellular transceiver 16 includes a customizable data storage device 40 such as a nonvolatile electrically alterable read-only memory or EPROM. Transceiver 16 further includes a signal-processing element 42 disposed downstream of storage device 40, an HF transmission element 44 disposed downstream of signal-processing element 42, and a switch 46 for closing a current supply circuit.

The customizable data storage device 40 contains personal data pertaining to the cellular phone user. For example, if the user is a child the device 40 may contain the child's home telephone number or other telephone numbers to be called in an emergency. The device 40 is not limited to the storage of telephone numbers but may contain a wide variety of information such as medical data or other data that could prove useful in an emergency, for example. The personalized data may be stored in storage device 40 by a user via the telephone keypad or other auxiliary input device. In one embodiment of the invention the customizable data storage device 40 is configured, as a detachable mass memory card 48 that is accepted and read by a card reader. As is well known, such memory typically contain several memory chips and a connector at the end of the card. An example of such a memory card used in personal computers operates in accordance with the PCMCIA standard defined by the Personal Computer Memory Card International Association. These memory cards may contain a substantial amount of personal data pertaining to the cardholder, such as medical information, for example. In an emergency, this data is available as so-called emergency data that can be transmitted in an emergency call message.

Signal-processing element 42, which comprises a digital signal processor 41 and two digital-analog converters 43, serves to prepare the emergency call message and produce an analog baseband signal. Signal-processing element 42 is connected to storage device 40 by way of a PCM bus and, using the personal data therein, generates the quadrature components of a burst-modulated baseband signal. The HF transmission element 44 converts this baseband signal into an HF signal, which is then amplified and emitted via an antenna.

The current supply of the above components is provided by way of switch 46. Switch 46 is closed by manual operation of an actuator such as a normally-open, push-button switch, toggle switch, rotary switch, or other suitable actuating device. If the user of cellular telephone 12 has recorded emergency data in storage device 40, a cellular call containing the emergency data can be transmitted to cellular station 20 at any time by activation of switch 46. Advantageously, the location information received by GPS receiver 14 is also transmitted to cellular station 20 upon operation of switch 46. The emergency data and location information are in turn forwarded to receiving station 24 where it is communicated to an operator or dispatcher. While FIG. 2 shows one particular embodiment of the inventive cellular transceiver 16, one or ordinary in the art will recognize that many other arrangements are also possible. For example, the transceiver 16 may be configured to transmit the emergency data in analog or digital form.

The present invention may be particularly beneficial to parents when a child is away from home and unaccompanied. If a child were carrying the inventive cellular telephone when a situation arose in which the child required assistance, the child could quickly and easily dial the telephone number of a receiving station such as a "911" facility so that the child's current location (as determined by the GPS system) and previously recorded emergency data.(stored in data storage device 40) are automatically transmitted thereto. As previously mentioned, the emergency data may include the child's home telephone number or other number to be called in an emergency. Upon receipt of the information at the receiving station 24, a dispatcher can call the received telephone number to notify the parent of the situation. Other individuals that may find particular benefit from the present invention include the hearing-impaired since the invention allows them to transmit critically needed information without speaking.

To increase portability by eliminating the need for a telephone keypad, the present invention may be configured as a transmitter rather than a transceiver, and which functions to dial only a single telephone number such as a "911" facility. Such an arrangement also may be particularly suitable for children since the child can only use the device for emergency purposes and cannot place any other telephone calls. In this configuration the manual actuator that operates the switch 46 could also serve to automatically initiate the telephone call. The telephone number to be dialed may be programmable (possibly by an interior switch or switches so as to be inaccessible to children) so any one receiving station may be contacted.

What is claimed is:

1. A transmitter for communication over a cellular system, comprising:

a data storage device electronically storing predefined personal identity information unique to the person using said transmitter for communication to a receiving station over the cellular system, the predefined personal identity information being exclusive of any transmitter identifying number and exclusive of the transmitter's location, wherein the data storage device is located in the transmitter;

a position-finding receiver for determining a current geographic location of the transmitter;

a signal processing element for providing a signal that includes said predefined personal identity information unique to the person using said transmitter and said current location;

a transmission element receiving said signal from said signal processing element and, in response thereto, transmitting a cellular signal that includes said predefined identity information unique to the person using said transmitter and said current location, wherein the transmission element is unattached to a person corresponding to the personal identity information; and a manually operable actuator for establishing communication with a receiving party over the cellular system and initiating transmission of said cellular signal thereto, wherein the transmitter is capable of being handheld.

2. The transmitter of claim 1 wherein said data storage device is a nonvolatile electrically alterable read-only memory.

3. The transmitter of claim 1 wherein said data storage device is a detachable mass memory card.

4. The transmitter of claim 1 wherein said position finding receiver receives position information from a global position system (GPS) satellite.

5. The transmitter of claim 1 wherein said manually operable actuator includes a telephone keypad.

6. The transmitter of claim 1 wherein said manually operable actuator is configured to initiate communication with a single predefined receiving party.

7. The transmitter of claim 1 wherein said predefined information includes a home telephone number of a user.

8. A method for communicating information over a cellular system via a transmitter capable of being handheld, comprising:

storing predefined personal identity information unique to a person using said transmitter for communication to a receiving station over the cellular system, the predefined personal identity information being stored locally at the transmitter, being exclusive of any transmitter identifying number, and exclusive of the transmitter's location;

determining a current geographic location of the transmitter;

providing a signal that includes said predefined personal identity information unique to the person using said transmitter and said current location; and establishing communication with a receiving party over the cellular system and initiating transmission of said signal thereto that includes said predefined personal identity information and said current location.

* * * * *